United States Patent
Dharmaji et al.

(10) Patent No.: US 9,047,618 B2
(45) Date of Patent: Jun. 2, 2015

(54) OPERATING SYSTEM BASED EVENT VERIFICATION

(75) Inventors: Srinivasa Dharmaji, Cupertino, CA (US); Pavel S. Veselov, Santa Clara, CA (US)

(73) Assignee: Goldspot Media, Inc., Santa Clara, CA (US)

(*) Notice: Subject to any disclaimer, the term of this patent is extended or adjusted under 35 U.S.C. 154(b) by 844 days.

(21) Appl. No.: 12/852,340

(22) Filed: Aug. 6, 2010

(65) Prior Publication Data

US 2012/0036022 A1    Feb. 9, 2012

(51) Int. Cl.
  *G06Q 30/00* (2012.01)
  *G06Q 30/02* (2012.01)
(52) U.S. Cl.
  CPC ........ *G06Q 30/0241* (2013.01); *G06Q 30/0273* (2013.01); *G06Q 30/0277* (2013.01)
(58) Field of Classification Search
  CPC ..................................................... G06Q 30/02
  USPC ........ 704/14.41; 705/14, 10, 35, 14.69, 14.73
  See application file for complete search history.

(56) References Cited

U.S. PATENT DOCUMENTS

| | | |
|---|---|---|
| 2002/0099816 A1 | 7/2002 | Quarterman et al. |
| 2005/0192867 A1* | 9/2005 | Haitsuka et al. ................. 705/14 |
| 2006/0095472 A1* | 5/2006 | Krikorian et al. ........... 707/104.1 |
| 2006/0212350 A1 | 9/2006 | Ellis et al. |
| 2008/0004958 A1* | 1/2008 | Ralph et al. ...................... 705/14 |
| 2008/0186233 A1 | 8/2008 | McCoy |
| 2008/0245863 A1 | 10/2008 | Buchheit |
| 2008/0249905 A1 | 10/2008 | Wong et al. |
| 2009/0043648 A1 | 2/2009 | Mahdan et al. |
| 2009/0094111 A1 | 4/2009 | Wu et al. |

* cited by examiner

*Primary Examiner* — Sun Li
(74) *Attorney, Agent, or Firm* — Michael A. Glenn; Perkins Coie LLP

(57) ABSTRACT

A system and method for tracking beacon execution using event verification capability of an operating system. Displaying targeted advertisements during content viewing and web browsing and tracking the rendered and displayed advertisements for payment based on completion of viewing using means for keeping count, with verifiable IDs, of beacon execution using the operating system capability to verify application activity.

15 Claims, 3 Drawing Sheets

OPERATING SYSTEM BASED EVENT VERIFICATION

BACKGROUND OF THE INVENTION

1. Technical Field

The invention relates to targeted advertising. More specifically, the invention relates to a system for trustworthy tracking of rendered and displayed advertisements for payment based on completion of viewing.

2. Description of the Related Art

Targeted and focused advertising is a way to reach people directly with items of interest to them. The wide spread use of mobile handheld display devices (MHDDs), like cell phones and personal digital assistants (PDAs), in conjunction with stationary display devices (DDs), have made the rendering and execution of content, including the targeted advertisements, a very complex process. Since the MHDDs can be used to view preloaded content even when they are disconnected from a network, targeted advertisements are also prestored on the MHDDs to be rendered and displayed when the selected content is viewed on the MHDDs.

Typically, payment for content and the advertisements used in the content is based on the number of times the content and the associated advertisement is viewed by the customer. This payment model necessitates tracking the content and viewing the content to ensure that the content and advertisements are effectively presented in a predefined fashion, and hence are eligible for payment. According to the prior art, this is done by the use of beacons attached to the content. Using beacons, the tracking of the rendering and of the display of the content is explained in terms of the content. The systems for tracking the viewing of content are explained using MHDD as the basis as viewing of the content on DDs form a simpler subset of that on the MHDD.

FIG. 1 shows a typical implementation of the prior art system 1000 for evaluating and tracking the viewing of content 103 including associated advertisements on an MHDD. Content providers 101 generate the content 103 and supply them to the web server 201. The content 103 contains beacons 104, which are embedded executable script, as part of the content. The web server 201 generates web pages 202 by combining content 103 from multiple content providers 101. These web pages 202 are stored in a library 203 on the web server. The web pages contain, as part of the content 103, the beacons 104. During connected time, when the MHDD 301 is connected to the net, the content 103 can be downloaded on to the MHDD 301 and stored. When this content 103 is viewed, as the specific portion of the content 103 with the beacon 104 is rendered and displayed, the beacons 104 are executed on the web browser 302. The number of times each beacon 104 is executed on the web server 302 is transferred 306, by the web server, to a tracking server 401 directly when the MHDD 301 is connected to the internet. If not, this beacon 104 execution count on the web browser 302, is stored on the MHDD 301, and transferred to the tracking server 401 when an active connection is established. The tracking server 401 uses this count to establish the payment criteria, as per predefined agreements, to the content and advertisement providers 101.

The use of beacon 104 execution counts on the web browser 302 is not a very trustworthy indication of the rendering and display of the content 103 and advertisements. This is due to the fact that it is possible to invisibly encapsulate beacons 104 and add them to the content 103. As a result a larger than actual count may be produced during rendering of a content 103 without really displaying the content multiple times. Similarly it is possible to make beacons 104 inactive during content 103 display such that the beacon 104 execution count that is provided to the tracking server is less than the number of times the content 103 is actually rendered and displayed.

SUMMARY OF THE INVENTION

The invention relates to display of targeted advertisements during content viewing and web browsing and especially to trustworthy tracking of rendered and displayed advertisements for payment based on completion of viewing.

The method of using the capability of operating systems, wherein an application can ask the Operating system to verify an applicable activity within the system, to provide a count of execution of beacons embedded in the content.

The method and system for enabling a trust worthy means for keeping count, with verifiable IDs, of beacon execution during content viewing, using the operating system capability to verify application activity.

DETAILED DESCRIPTION OF THE INVENTION

Figure 1:
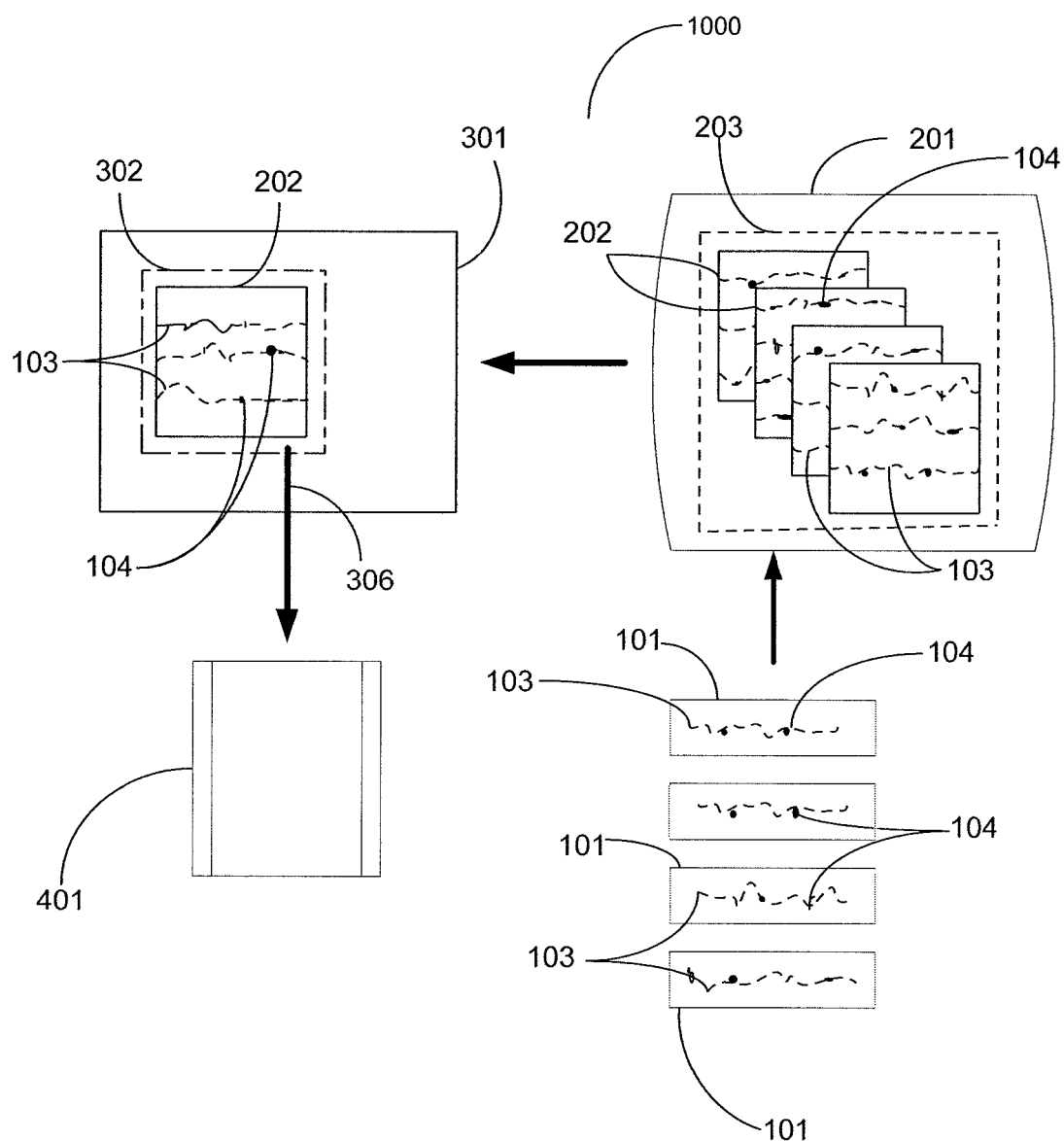
FIG. 1 shows a typical implementation of the prior art system for evaluating and tracking the viewing of content including associated advertisements on an MHDD according to some embodiments of the invention.

As explained above in the discussion of FIG. 1, the use of beacon 104 execution counts on the web browser 302 is not a very trustworthy indication of the rendering and display of the content 103 and advertisements. This is due to the fact that it is possible to invisibly encapsulate beacons 104 and add them to the content 103. As a result a larger than actual count may be produced during rendering of a content 103 without really displaying the content multiple times. Similarly it is possible to make beacons 104 inactive during content 103 display such that the beacon 104 execution count that is provided to the tracking server is less than the number of times the content 103 is actually rendered and displayed.

Hence it would be advantageous if a fully trustable means for generation of the count of the content 103 rendering by execution of beacons 104 may be established, and further provided to a tracking server 401 to enable a reliable payment criteria.

Today targeted advertisements are displayed during browsing the web or viewing content. On display devices (DDs) which may be mobile handheld display devices (MHDDs) the advertisements and content for viewing are downloaded and stored enabling these advertisements and content to be displayed even when the MHDD has no connection to the internet. Payment is made only for viewed content and the associated viewed advertisements. Today a method based on count of completed viewings, using embedded tracking beacons, which are typically small scripts, executed on the browser, is used for tracking this. This is an un-trustworthy system as simulated beacon execution and beacon elimination are both possible on the browser.

A new method of tracking the beacon execution using event verification capability of an operating system is disclosed as a trustable alternate to browser based beacon execution. The execution counts are sent to a tracking server, during connected time, to enable compilation and payment.

Operating systems related operations are a well understood and trusted. Hence in order to get an accurate and trusted measure of the content and advertisement display it is better if the capabilities of the operating system can be used. In operating systems, an application can ask the operating system to verify an applicable activity within the system. This capability is used to confirm the execution of the content and the advertisements. This capability is used with a unique library and an application programming interface (API), in the disclosed verifiable and trustable implementation, to confirm the number of executions of a specific functionality in a verifiable manner. This capability can be applied to the execution of beacons and to provide a verifiable count to a registered tracking server with caller ID and event ID both of which ensure the correctness of the event execution. The operating system can store the execution count information on the MHDD if the connection to the server via the network is unavailable and download the information when connection is established in an authenticated manner. The communication between the tracking server and the MHDD can be enabled using any suitable method of authentication available. Here again the system explanation is provided based on the content being rendered and displayed on MHDDs as rendering and displaying on DDs form a simpler sub set.

Figure 2:
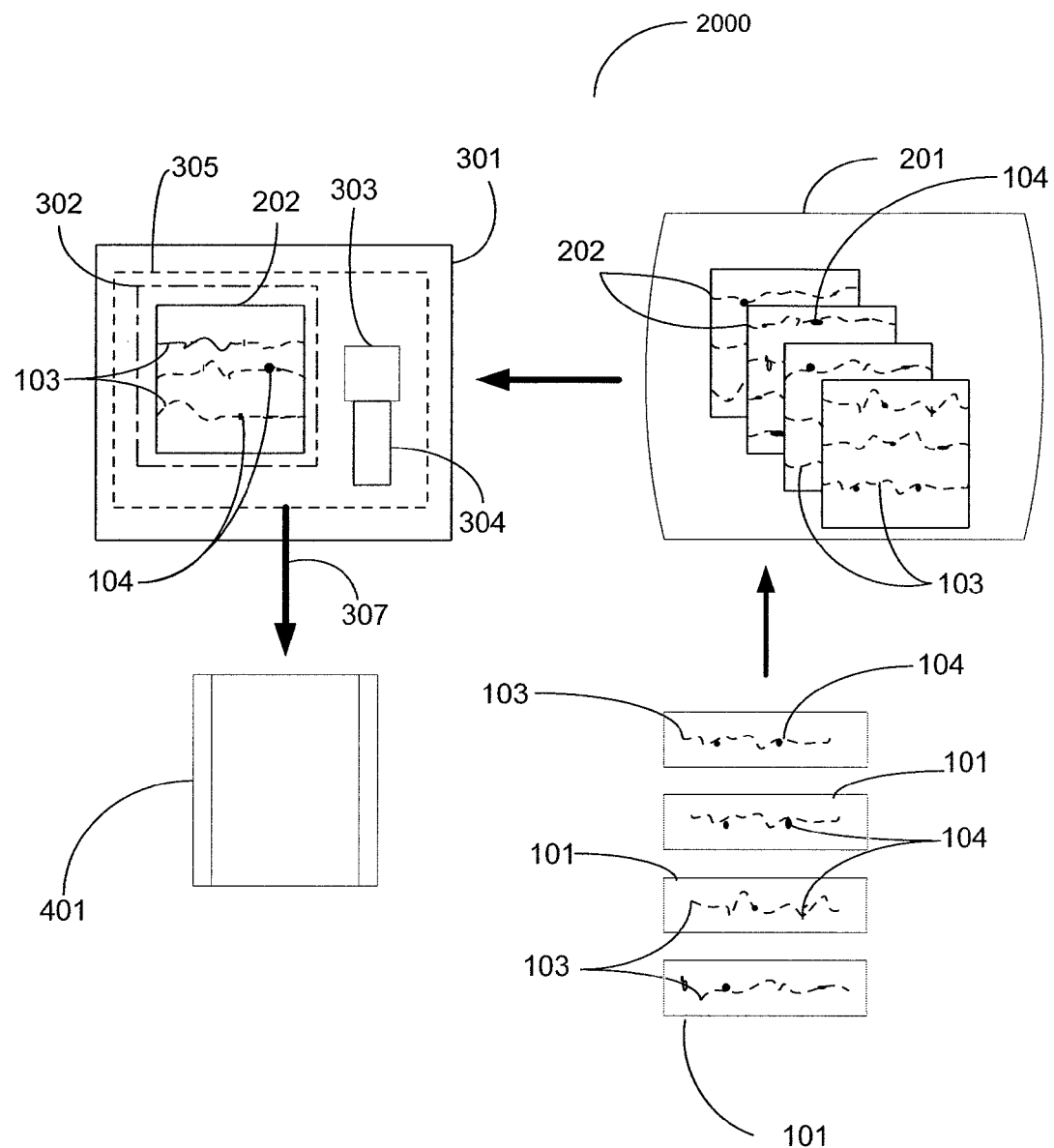
FIG. 2 shows an exemplary and non limiting block diagram of a system for tracking beacon execution using event verification capability of an operating system according to some embodiments of the invention.

FIG. 2 shows an exemplary and non limiting block diagram 2000 of a system implementing the present invention. Content providers 101 generate the content 103 and supply them to the web server 201. The content 103 will contain beacons 104 as part of the content. The web server 201 generates web pages 202 by combining content 103 from multiple content providers 101. These web pages 202 are stored in a library 203 on the web server. The web pages contain as part of the content 103 the beacons 104. During the period or time when the MHDD 301 is connected to the net (connected time) the content 103 can be downloaded on to the MHDD 301 and stored. An API 303 with an associated library 304 is pre-loaded on the MHDD 301, which enables the operating system 305 of the MHDD to identify, verify and confirm the number of executions of a specific functionality, namely the execution of each of the embedded beacons 104, identified by the library, in a verifiable manner with an associated caller ID and event ID. Hence the operating system 305 is able to provide a verifiable count of the execution of the beacons 104, and thereby the rendering of the content and advertisement, to the tracking server 401. This verified beacon 104 execution count is fully trustable as operating system 305 based verification of the execution of any applicable activity is trust worthy and difficult to manipulate. The information is transferred 307, to the tracking server 401 by the operating system 305. This can be done in an encrypted and secure fashion using any available method. This information can be used to generate a payment based on a payment criteria, pre-established for the content 103 including the advertisements, that is verifiable and trustable by all.

Figure 3:
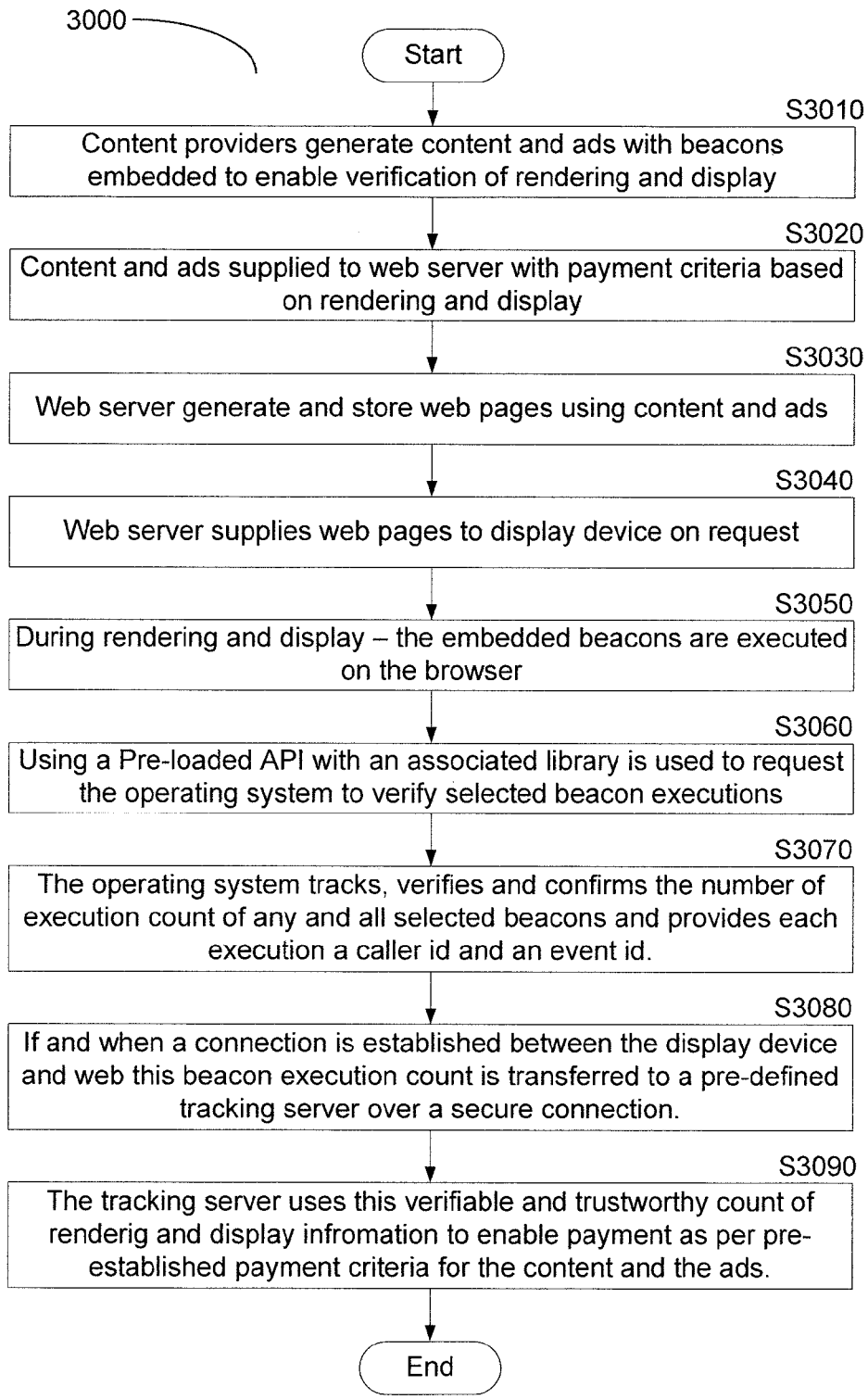
FIG. 3 is a simplified, exemplary and non-limiting flowchart of a method of for tracking beacon execution using event verification capability of an operating system according to some embodiments of the invention.

FIG. 3 is a simplified, exemplary and non-limiting flowchart 3000 of the current invention executed by system shown in FIG. 2. The content 103 and advertisement providers 101 generate and supply the content 103 and advertisements with embedded beacons 104 (S3010). These beacons 104 are embedded in the content and advertisements to enable verification of the rendering and display of the content and advertisements 103. This content 103 and advertisements are supplied to the web server 201 with payment criteria established based on a count of the number of times a content 103 and associated advertisements are displayed (S3020). The web server 201 receives content 103 and associated advertisements from a number of content suppliers 101 and generates and stores these as web pages 202 in a library of web pages (S3030). When a user of a DD or MHDD 301 requests a web page 202 the web page 202 is supplied with built in content 103 and associated advertisements. This content 103 has the embedded beacons 104 associated with the content (S3040). During rendering and display of the content and associated advertisements on the web browser, the embedded beacons are executed on the browser (S3050). A pre-loaded API 303 with a library 304 is used to request the operating system 305 of the DD or MHDD to verify selected beacon 103 executions in the system of the DD or MHDD 301 (S3060). The operating system 305, based on the request, verifies and confirms the selected beacon 104 executions on the browser of the system. Each selected beacon 104 execution is identified by the operating system 305 with a caller ID and an event ID. Since the caller ID and event ID are specific capability of the operating system 305, these are not modifiable and hence are trust worthy. The operating system 305 is hence able to keep a verifiable and trustable count of the number of times each selected beacon 104 is executed during the rendering and display of the web page 202 with content 103 viewing on the browser 302 (S3070). Whenever the DD or MHDD 301 is connected to the web, the operating system is able to transfer the verifiable and trustable count of the execution of selected beacons to a pre-defined tracking server 401 (S3080). The tracking server based on the verified count, with caller id and event id, is able to generate a payment, for the viewed content 103 and advertisements, based on the payment criteria previously established (S309).

The principles of the invention or part thereof are implemented as hardware, firmware, software, or any combination thereof. Moreover, the software is preferably implemented as an application program tangibly embodied on a program storage unit or non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer or communication platform having hardware such as one or more central processing units ("CPUs"), a memory, and input/output interfaces. The platform may also include one or more operating systems and microinstruction codes. The various processes and functions described herein may be either part of the microinstruction code or part of the application program, or any combination thereof, which may be executed by a CPU, whether or not such computer, communication system or processor is explicitly shown. In addition, various other peripheral units may be connected to the platform such as an additional data storage unit and a printing unit.

Even though the implementations disclosed and described herein are the preferred ones, it is not meant to be limiting. There may be modifications and improvements which may be applicable and are clear to practitioners of the art. There are also many different applications of the trustable verification process, which are not enumerated, herein. These modifications of the invention, not presently described or foreseen, may nonetheless represent equivalents thereto which are also covered by this disclosure.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A method of verifying an event on a display device, comprising:
   establishing a digital connection between at least one content provider and at least one server configured for networking display devices with content providers;
   publishing digital content by said at least one content provider, wherein said digital content comprises actual content and at least one advertisement, wherein said step of publishing comprises establishing one or more payment criteria used to determine how said at least one content provider is to be paid for delivering said at least one advertisement;
   transferring said digital content to said at least one server;
   establishing a digital connection between said at least one server and at least one display device that includes a processor operatively coupled with a network interface and a device memory, wherein said processor runs an operating system;
   downloading and storing said digital content to said display device;
   executing said digital content on said display device;
   responsive to receiving a request through an application programming interface (API), said operating system identifying and confirming the execution of said at least one advertisement associated with one or more verified beacons, wherein said confirmation comprises saving verification information; and
   transferring said verification information from said operating system to a tracking server, wherein said tracking server includes a processor configured for determining how said at least one content provider is to be paid for delivering said at least one advertisement by accounting for said one or more verified beacons.

2. The method of claim 1, further comprising providing a plurality of content providers and a plurality of display devices.

3. The method of claim 2, wherein said plurality of display devices comprises at least one network of handheld mobile devices.

4. The method of claim 1, further comprising:
   encrypting said verification information before transfer to said tracking server.

5. The method of claim 1, wherein said step of publishing comprises establishing one or more payment criteria that determines how said at least one content provider is to be paid for delivering said at least one advertisement.

6. The method of claim 1, further comprising the step of delivering payment to said at least one content provider based on the accounted for verified beacons according to said one or more payment criteria.

7. The method of claim 1, wherein publishing digital content by said at least one content provider further comprises pre-storing said at least one advertisement on said display device for rendering and displaying in the absence of a connection to said server.

8. A system comprising:
   a display device having a web browser;
   said display device further having an operating system that tracks selected events with unique caller IDs and event IDs;
   an application programming interface with a unique library attached to said operating system;
   a web server linked to said display device for providing web pages with content and associated advertisements to said display device on request;
   a content provider linked to said web server for providing said content with embedded beacons and said associated advertisements for inclusion in said web pages;
   a tracking server linked to said display device to receive an execution count of said embedded beacons on said web browser;
   said web browser executing said embedded beacons during rendering and display of said content during viewing of said web pages on said display device;
   said operating system receiving through said application programming interface a selection of a set of embedded beacons from any of said embedded beacons that are executed by said web browser for tracking by said operating system;
   said operating system tracking and keeping a verifiable count of said selected beacons executed over the web browser;
   said operating system transferring said verifiable count to said tracking server when a connection over the web is available; and
   said transfer of said verifiable count of said execution of said beacons on said web browser by said operating system enabling said tracking server to use a predefined criteria to enable payment for said content and associated advertisements.

9. The system of claim 8, wherein said verified execution of content guarantees rendering and display of said associated advertisements.

10. The system of claim 8, wherein said payment for said associated advertisements is based on said verifiable count of said embedded beacons.

11. The system of claim 8, wherein said display device is a mobile handheld display device.

12. The system of claim 11 wherein said content and associated advertisements are pre-stored on said mobile handheld display device for rendering and display when said mobile handheld device has no web connection.

13. A system comprising:
   a display device having a web browser that executes scripts thereon;
   said display device further having an operating system that tracks selected events with unique caller IDs and event IDs;
   an application programming interface with a unique library attached to said operating system to select events to be tracked;
   said display device having a web server interface to request and receive web pages with content and advertisements;
   said content and advertisements containing scripts in the form of embedded beacons therein;
   said display device further having an interface to a tracking server which keeps track of said viewing status and a measure of the number of times each content and advertisement is viewed;
   said operating system receiving through said application programming interface a selection of a set of embedded beacons from said embedded beacons embedded within said content and advertisements to be tracked by said operating system;

said operating system tracking and providing a verifiable ID and count of said execution of said selected set of embedded beacons on said web browser; and said operating system sending said count of execution of said selected embedded beacons on said web browser to said tracking server over said interface to track and keep a verifiable count of a number of times content and advertisements are viewed.

14. The system of claim 13, further comprising:

using said verifiable count of said number of times content and advertisements are viewed to pay for the content and advertisements as per a predetermined payment criteria.

15. A mobile device configured to reliably verify the occurrence of an event, comprising:

a processor coupled with a memory;

a network interface operatively coupled with said processor and configured for dynamically establishing a digital connection between said mobile device at least one content provider via at least one server;

a media player operatively coupled with said processor and configured for rendering digital content for display, said media player further configured for ingesting digital content published by said at least one content provider, wherein said digital content comprises actual content and at least one advertisement;

said processor configured to run an operating system;

an application programming interface (API) through which said operating system identifies and confirms the display of one or more advertisement in the form of an execution count of one or more verified beacons;

said operating system saving said execution count of said one or more verified beacons in said memory to preserve said execution count of said one or more verified beacons when said mobile device is not connected to said at least one server; and said operating system transferring said execution count of said one or more verified beacons to said at least one server when said mobile device is connected to said at least one server.

* * * * *